March 20, 1945.
L. S. DEITZ, JR
2,371,679
MATERIAL EXTRUDING APPARATUS
Filed July 21, 1943
2 Sheets-Sheet 1
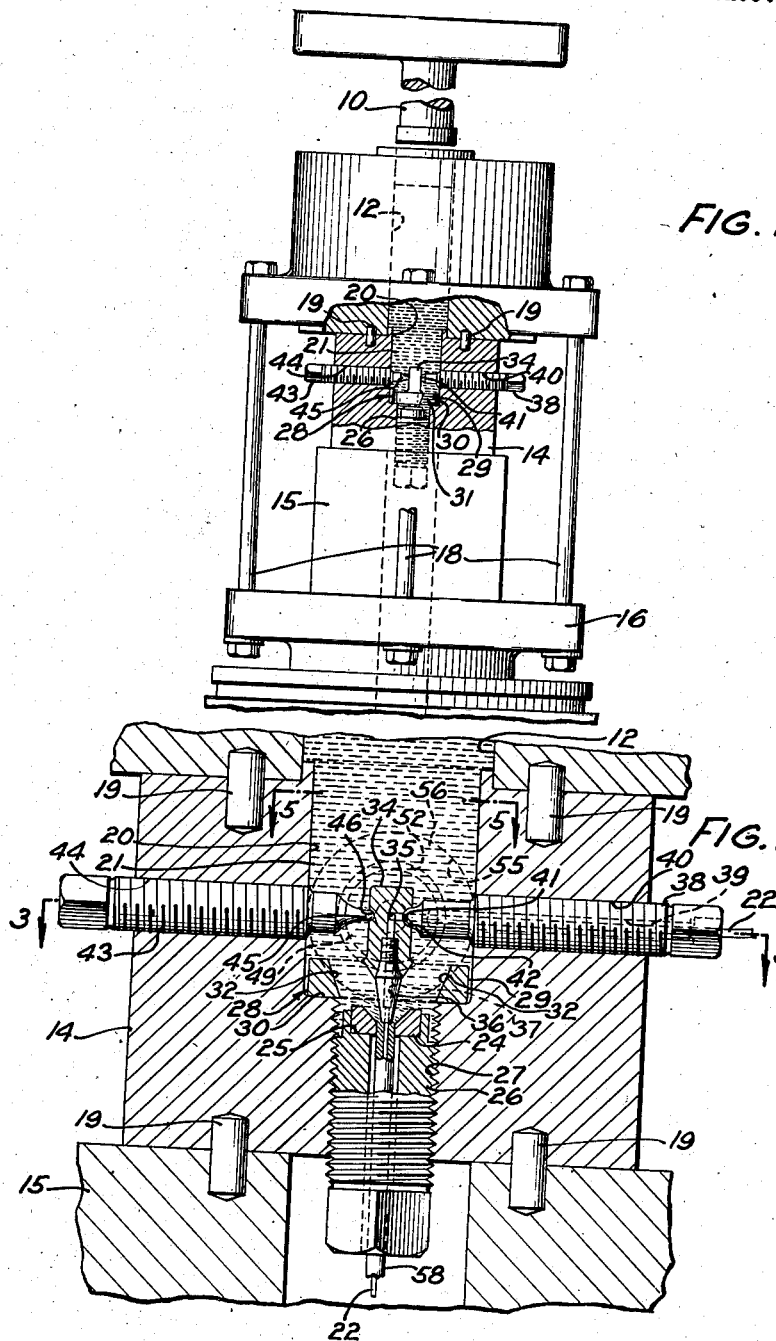
INVENTOR
L. S. DEITZ, JR.
BY
ATTORNEY March 20, 1945.   L. S. DEITZ, JR   2,371,679
MATERIAL EXTRUDING APPARATUS
Filed July 21, 1943   2 Sheets-Sheet 2
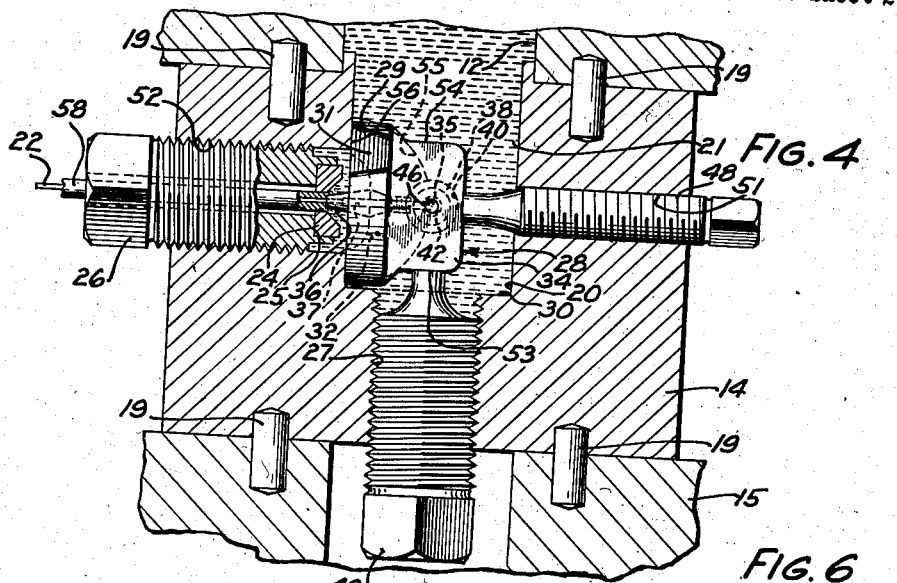
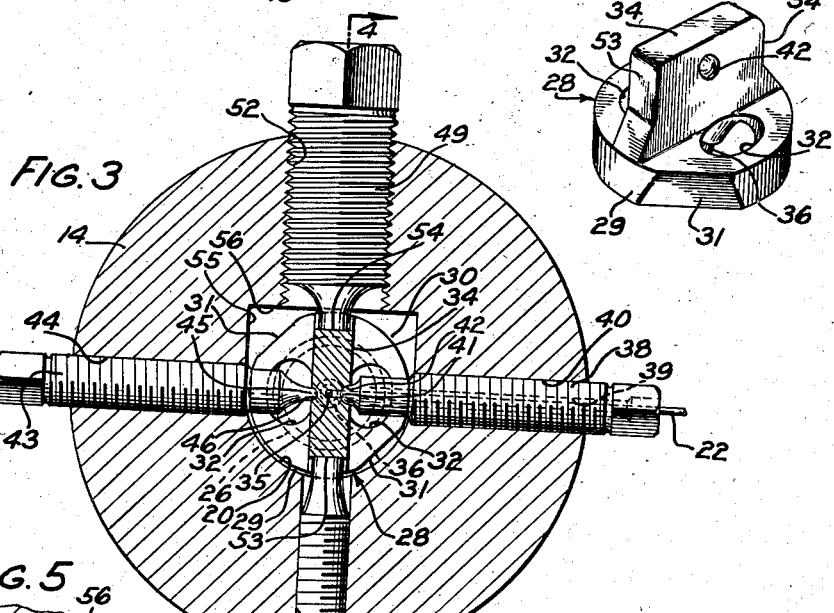
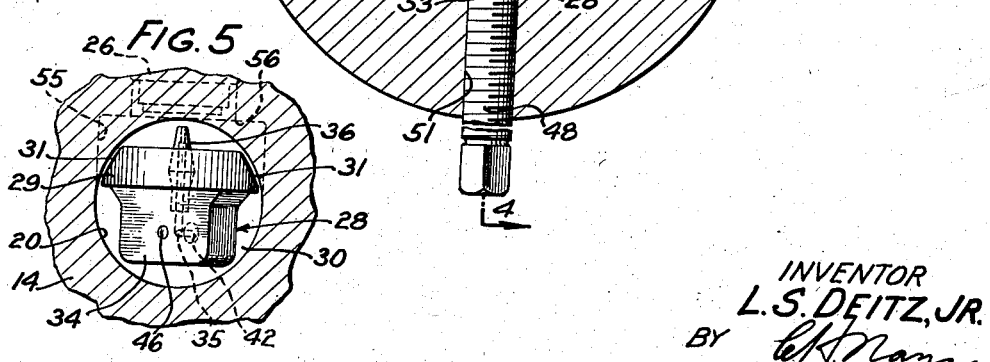
INVENTOR
L. S. DEITZ, JR.
BY
ATTORNEY Patented Mar. 20, 1945

2,371,679

UNITED STATES PATENT OFFICE 2,371,679

MATERIAL EXTRUDING APPARATUS

Louis S. Deitz, Jr., Westfield, N. J., assignor to Nassau Smelting & Refining Company, Incorporated, New York, N. Y., a corporation of New York Application July 21, 1943, Serial No. 495,555

14 Claims. (Cl. 207—4)

This invention relates to material extruding apparatus and more particularly to apparatus for extruding an envelope of lead, solder or the like about a core.

In making one type of extruded product it is desirable that it be extruded from the side of the die block for purposes of facilitating handling of the product. However, other types of products are more easily handled and are of better quality when extruded from the end of the die block opposite the conventional ram. With extrusion presses of the type formerly used, when one press was used to extrude several different types of products and it was desired to change from one type of product to another, the machine had to be dismantled and the die block and the core tube used for making the first type of product entirely replaced by a die block with a core feeding device and an extrusion die suitable to make the second type of product. Hence, various types of die blocks had to be provided for each press, which required the investment of considerable funds in equipment that was idle a great deal of the time.

An object of this invention is to provide new and improved extruding apparatus in which either side or end extrusion may be performed.

With the above outlined and other objects in view, one embodiment of the invention may comprise an extrusion press having a die block positioned between a pillow block and the extrusion cylinder of the press, and a core guide which may be adjusted to either the end of the extrusion chamber in the die block or the side of the chamber to align its passage with an extruding die secured either in an aperture in the end of the die block or in an aperture in the side of the die block.

Other objects and features of the invention will appear from the following detailed description of one embodiment thereof, taken in conjunction with accompanying drawings, in which Fig. 1 is a front elevational view of an extruding apparatus embodying the invention, in which a part thereof is shown in section;

Fig. 2 is an enlarged fragmentary vertical sectional view of the apparatus shown in Fig. 1 with the parts assembled for end extrusion;

Fig. 3 is a horizontal sectional view taken on line 3—3 of Fig. 2;

Fig. 4 is a fragmentary vertical sectional view taken on line 4—4 of Fig. 3 showing the parts assembled for side extrusion;

Fig. 5 is a fragmentary horizontal sectional view taken on line 5—5 of Fig. 2 during a step of the assembling of the apparatus for side extrusion, and Fig. 6 is a perspective view of a core guide forming a part of the apparatus.

In the specific embodiment of the invention herein described, an extrusion press of well known construction has a stationary ram 10 to force the core covering material out of an extrusion cylinder 12 which rests upon a die block 14 supported by a notched pillow block 15 of the type shown in Patent Number 2,241,543, granted on May 13, 1941. The pillow block 15 is in turn supported by the hydraulically movable base 16. Bolts 18—18 and dowel pins 19—19 secure the cylinder 12, the die block 14, and the pillow block 15 against relative displacement. The means for assembling the cylinder 12, the die block 14, the pillow block 15 and the base 16, as well as the general construction of the press, are of convengeneral design and will be readily understood by those skilled in the art. However, the construction of the die block 14 is materially different from that of the conventional die block.

Referring now to Figs. 2 and 3 of the drawings, wherein the apparatus is shown assembled for end extrusion, the die block 14 is provided with a cylindrical extrusion chamber 20 containing a material 21 to be extruded around a core 22 through a conventional die 24 mounted concentrically with respect to the axis of the cylindrical chamber 20. The material 21 may be lead, solder or the like depending upon the product being made. The die 24 is supported in a recess 25 formed in a hollow bolt 26 which is screwed into a threaded aperture 27 formed in the lower end of the die block 14.

As shown in Figs. 1, 2 and 3, there is provided a core guide 28 through which the core 22 may be guided. In the particular embodiments of the invention described herein the core 22 is a wire which is to be covered with lead, but the core may be molten rosin which runs in by gravity or is forced through the core guide under pressure and covered with solder to form the rosin cored solder of commerce.

The core guide 28 (Fig. 6) has a flat, generally circular base 29, the diameter of which is slightly less than that of the extrusion chamber 20 and which abuts the lower end 30 of the extrusion chamber. Rounded surfaces 31—31 are formed by cutting away portions of the periphery of the base 29. The base 29 has passages 32—32 formed therein to allow the core covering material 21 to pass from the extrusion chamber 20 to the die 24. The core guide 28 also has a head 34 having an L-shaped passage 35 formed therein. A core tip 36 securely threaded into the head 34 has a passage 37 therein aligned with one portion of the passage 35.

An externally threaded core tube 38 having an axial passage 39 therethrough is screwed into a threaded bore 40 in the die block 14. The core tube 38 has a rounded tip 41 bearing against a corresponding concave surface 42 formed upon the head 34, with the passage 39 of the core tube aligned with one end of the passage 35. The core 22 is carried through the passage 39 in the core tube 38, through the passage 35 in the core guide 28 and out of the passage 37 in the core tip 36. The core 22 may be a fluid material, such as molten rosin, which is supplied under pressure to the outer end of the passage 39 in the core tube 38 in a manner well known to those skilled in the art, or it may be a solid wire that is advanced through the passages 39, 35 and 37 by conventional means.

An adjusting bolt 43 threaded in a bore 44, whose axis is aligned with the axis of the core tube, has a convex tip 45 fitting against a concave surface 46 formed upon the side of the head 34 opposite the side upon which the concave surface 42 is formed. An adjusting bolt 48 and a large adjusting bolt 49, the diameter and pitch of thread of which are the same as those of the hollow bolt 26, are threaded into aligned bores 51 and 52, respectively, in opposite sides of the die block 14. The axes of the bolts 48 and 49 are perpendicular to the axes of the core tube 38 and the bolt 43. The end of the bolt 48 abuts against a surface 53 (Fig. 3) which is on the opposite side of the head from a surface 54 against which the end of the bolt 49 presses.

In using the apparatus for end extrusion, the several parts of the apparatus are assembled in the illustrated manner in Figs. 1, 2 and 3 of the drawings. The material 21 to be extruded is forced by the ram 10 out of the cylinder 12 into the chamber 20, through the openings 32—32 around the core tip 36, through the die 24, and around the core 22 emerging from the passage 37 of the core tip 36. The material 21 is formed by the die 24 into a thin sheath 58 around the core 22, thereby producing the finished product.

The passage 37 of the core tip 36 may be aligned and firmly retained in a position concentric with the die 24 at any time after assembly of the press by adjusting the position of and securing the core guide 28 by means of the adjustable bolts 43, 48 and 49 and the core tube 38. The relative positions of the die 24 and the end of the core tip 36 may be adjusted in the direction along their axes by screwing the hollow bolt 26 either into or out of the die block 14, as may be desired. The notched pillow block permits adjustment of the hollow bolt 26 after the press has been assembled and at any time during the operation of the press that such adjustment may be necessary.

If it is desired to change the press from bottom extrusion (Figs. 1, 2 and 3) to side extrusion (Fig. 4), the press may be dismantled so that the die block 14 may be removed from the top of the pillow block 15. The bolts 43, 48 and 49 and the core tube 38 holding the core guide 28 are withdrawn from the extrusion chamber 20 and the core guide is removed from the chamber. The core guide 28 then is turned through an angle of 90° and is inserted into the chamber 20 in the manner illustrated in Fig. 5. The cut out portions forming the surfaces 31—31 on the core guide provide clearance between the base 29 and the wall of the chamber 20 and thus permit the core guide to be inserted into the chamber 20.

The core guide 28 is then inserted into a socket 55 formed in the vertical wall of the chamber 20 concentric the bore 52. The socket 55 has a flat bearing surface 56 at the inner end thereof which is slightly larger in diameter than the base 29 on the core guide 28. The core guide is positioned in the socket 55 with the base 29 bearing against the surface 56 and the bolts 43 and 48 and core tube 38 are tightened so that they bear against the head 34 of the core guide. The large bolt 49 and the hollow bolt 26 with the die 24 are interchanged in their respective bores in the die block and the large bolt 49 is tightened so that its end bears against the surface 53 of the head 34. The hollow bolt 26 is adjusted to the position in the bore 52 desired for side extrusion and the several adjusting bolts and the core tube are adjusted until the various parts are properly aligned and spaced.

The axis of the core tip 36 may be aligned with the center of the die 24 by adjusting the bolts 43, 48 and 49 and the core tube 38 so that the extruded sheath and the core 22 will be concentric. The die 24 may be adjusted toward or away from the core tip 36 by screwing the hollow bolt 26 into or out of the die block 14 the required distance. The material 21 is extruded through the apertures 32—32 in the core guide 28, around the core 22 emerging from the passage 37 in the core tip 36 and through the die 24 to form a sheathed article which passes out of the hollow bolt 26. If further adjustments of the core tube 28 and the die 24 are found to be necessary after an extrusion operation, they may be made without dismantling the press.

The particular press herein illustrated as embodying the invention is a vertical press with a movable extrusion cylinder below a fixed ram and is used to extrude a covered core. It will be obvious that this precise arrangement is not essential to the invention and any suitable type of press may be used therewith. Also, a homogeneous product may be extruded either from the bottom or side of the die block 14 by removing the core guide 28 and positioning the die 24 either in the bottom or the side of the die block 14.

The invention as described above provides simple and very effective means for extrusion which can be used for several types of extrusion and is highly satisfactory. By the use of apparatus of the type embodying this invention, the expense of providing several types of die blocks for each press is avoided, and, in addition, a material saving in critical metal may be effected.

What is claimed is:

1. An extrusion apparatus comprising a die block having an extrusion chamber formed therein, and also being provided with an aperture in the end of the chamber and an aperture in a side of the chamber; a die adapted to be secured in the aperture in the end of the chamber or in the aperture in the side thereof, a core guide adapted to be secured either in a position to guide a core through the die when the die is secured in the aperture in the end of the extrusion chamber or in a position to guide a core through the die when the latter is secured in the aperture in the side of the extrusion chamber, and a plurality of members capable of securing the core guide in either of said positions.

2. An extrusion apparatus comprising a die block having an extrusion chamber formed therein and also being provided with an aperture formed in the bottom of the die block and an aperture formed in a side thereof, a die which may be positioned either in the aperture in the end of the die block or the aperture in the side thereof, and a core guide adapted to be secured in alignment with the die in either of the positions of the die.

3. An extrusion apparatus comprising a die block having formed therein an extrusion chamber, and also being provided with an aperture formed in the bottom of the die block and an aperture formed in the side thereof, a die which may be positioned either in the aperture in the end of the die block or in the aperture formed in the side thereof, a core guide adapted to be secured in alignment with the die in either of the apertures in which the die may be positioned, and means to secure the core guide in alignment with the die when the die is positioned in either of the apertures.

4. An extrusion apparatus comprising a die block having formed therein an extrusion chamber and a pair of angularly disposed apertures extending from the chamber to the exterior thereof, a die adapted to be positioned in either of the apertures, a core guide capable of being aligned with the die when the latter member is positioned in either of the apertures, and a plurality of adjustable members for securing the core guide in alignment with the die when the die is positioned in either of the apertures.

5. An extrusion apparatus comprising a die block having formed therein an extrusion chamber and a plurality of angularly disposed die-receiving apertures extending from the chamber to the exterior thereof, and a material forming die adapted to be secured in any of the apertures.

6. An extrusion apparatus comprising a die block having formed therein an extrusion chamber and a plurality of angularly disposed extrusion apertures connecting the extrusion chamber with the exterior thereof, and a core guide adapted to be aligned with any of the extrusion apertures.

7. An extrusion apparatus comprising a die block having formed therein a pair of extrusion apertures whose axes form a right angle, a material forming die, and a member for supporting the die which may be selectively and adjustably positioned in either of the extrusion apertures.

8. An extrusion apparatus comprising a die block having formed therein an extrusion chamber and a plurality of extrusion apertures, a plurality of bearing surfaces formed by the walls of the chamber adjacent to the apertures, and a core guide adapted to engage any of the bearing surfaces.

9. An extrusion apparatus comprising a die block having formed therein an extrusion chamber and a plurality of extrusion apertures, a plurality of bearing surfaces formed by the walls of the chamber adjacent to the apertures, and a core guide adapted to adjustably engage any of the bearing surfaces.

10. An extrusion apparatus comprising a die block having formed therein an extrusion chamber and also being provided with an extrusion aperture at the end of the chamber and an extrusion aperture at a side of the chamber, bearing surfaces formed by the walls of the chamber, each surface being adjacent to one of the apertures, a core guide adapted to engage either of the bearing surfaces, and means to secure the core guide in adjustable engagement with either of the bearing surfaces.

11. An extrusion apparatus comprising a die block having formed therein an extrusion chamber and also being provided with an extrusion aperture at the end of the chamber and an extrusion aperture at the side of the chamber, a circular end bearing surface concentric with the aperture at the end of the chamber, a circular side bearing surface concentric with the extrusion aperture at the side of the chamber, a core guide having a substantially circular base adapted to abut either of the bearing surfaces, and means adapted to secure the core guide in position when the circular base thereof abuts either one of the bearing surfaces.

12. An extrusion apparatus comprising a die block having formed therein an extrusion chamber and also being provided with an extrusion aperture at the end of the chamber and an extrusion aperture at the side of the chamber, a bearing surface adjacent to the aperture at the end of the chamber, a bearing surface adjacent to the side extrusion aperture, a core guide having a base which fits against either of the bearing surfaces, and means to adjustably secure the core guide with the base thereof against either of the bearing surfaces.

13. In an extrusion apparatus, means to form an extrudable material into a sheath about a core comprising a die block having formed therein a cylindrical extrusion chamber provided with a flat bearing surface at the bottom thereof, a threaded end extrusion aperture in the bottom thereof, a threaded side extrusion aperture in the side thereof at a right angle to the first mentioned aperture, a plurality of smaller threaded apertures at spaced points in the side thereof and a cylindrical socket in the side thereof having a flat bearing surface at the inner end thereof which is concentric with the side extrusion aperture; a die; a threaded die holder adapted to secure the die adjustably in either of the extrusion apertures; a threaded plug adapted to be threaded into the extrusion aperture other than that in which the die holder has been threaded; a core guide including a central body member having bearing surfaces formed on the top and sides thereof and an L-shaped core guiding passage therein, and provided with a circular base having apertures therein for the flow of extruded material therethrough and designed to fit against either of the bearing surfaces; a core tube threaded into one of the smaller threaded apertures and fitting into the bearing surface on the core guide concentric with the passage to guide the core thereinto; and a plurality of bolts threaded into the other smaller threaded apertures which bear upon the other bearing surfaces on the core guide to secure the core guide so that a portion of the L-shaped passage therein is concentric with the die when the latter is secured in either of the two first mentioned apertures and also to secure the circular base against either the bottom bearing surface or the bearing surface at the inner end of the cylindrical socket.

14. An apparatus for extruding material comprising an extrusion chamber having a plurality of angularly displaced extrusion passages formed in the walls thereof, a core guide, and means for securing the core guide in alignment with any of the extrusion passages.

LOUIS S. DEITZ, Jr.